Patented Jan. 1, 1952

2,580,847

UNITED STATES PATENT OFFICE 2,580,847

THIOURONIUM ANTIMONYL CATECHOL HALIDES AND METHODS OF MAKING THE SAME

Maxwell Schubert, New York, N. Y., assignor to Abbott Laboratories, North Chicago, Ill., a corporation of Illinois No Drawing. Application March 20, 1950, Serial No. 150,792

4 Claims. (Cl. 260—446)

This invention relates to new and useful antimony compounds and more particularly to a thiouronium antimonyl catechol halide.

I have found that the thiouronium antimonyl catechol chloride is effective in treating platyhelminthes, which infects a tremendous portion of the human and animal population of the world, particularly in the tropical regions.

Generally, the compounds of my invention may be prepared by reacting, in a lower alcohol solvent, catechol, antimony trihalide and thiourea in the presence of an acid containing the same halogen anion as the antimony trihalide. The reaction mixture is allowed to stand until no more crystals form, and the crystals are then filtered off. The crystalline thiouronium antimonyl catechol halide is recrystallized from a lower alcohol solvent.

In more specific detail, the following example illustrates the process of preparing the compound of the invention.

Example

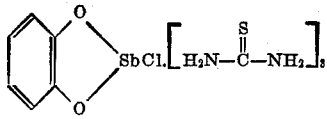

About 30 parts (by weight) of catechol dissolved in about 40 parts of ethanol, about 25 parts of antimony trichloride in about 40 parts of ethanol, and about 20 parts of concentrated hydrochloric acid and mixed together in a suitable container. To the mixture is added about 25 parts of thiourea in about 130 parts of hot 95% ethanol, with stirring. The reaction mixture is allowed to stand until the crystallization is completed, and the crystals are filtered off and recrystallized from a mixture of about 260 parts of hot 95% ethanol and about 16 parts of concentrated hydrochloric acid. Melting point of the thiouronium antimonyl catechol chloride is 85° to 95° C.

The reaction mixture in preparing the thiouronium antimonyl catechol halide should be substantially anhydrous or contain at least no more water than the bound water of the alcohol solvent, to prevent the hydrolysis of the antimony trihalide. Such lower alcohols as methyl, propyl, butyl, etc. alcohols may be used as solvents for the reaction.

The preferred compound of the invention is antimonyl catechol chloride, because of difficulties of preparing the other halogen derivatives.

Others may readily adapt the invention for use under varying conditions of service, by employing one or more of the novel features disclosed, or equivalents thereof. As at present advised with respect to the apparent scope of my invention, I desire to claim the following subject matter.

I claim:

1. A compound of the formula:

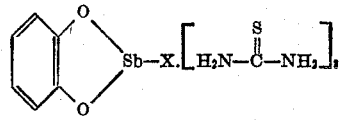

wherein X is a halogen atom.

2. The compound thiouronium antimonyl catechol chloride represented by the formula:

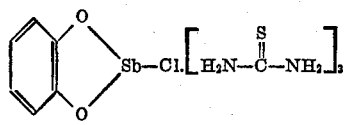

3. The process which comprises dissolving catechol and antimony trihalide in a lower alcohol in the presence of a halogen acid having the same halogen anion as that of the antimony trihalide, and adding thiourea to the resultant reaction mixture to form thiouronium antimonyl catechol halide.

4. A process according to claim 3 in which the antimony trihalide is antimony trichloride and the halogen acid is hydrochloric acid.

MAXWELL SCHUBERT.

REFERENCES CITED

The following references are of record in the file of this patent:

UNITED STATES PATENTS

| Number    | Name     | Date         |
|-----------|----------|--------------|
| 2,330,962 | Feinberg | Oct. 5, 1943 |

OTHER REFERENCES

Christiansen, "Organic Derivatives of Antimony," page 199, The Chemical Catalog Co. Inc., New York, 1925.

Taylor et al., Sidgwicks Organic Chemistry of Nitrogen, page 292, Oxford at Claredon Press, 1945.

Chem. Ab., vol. 11, page 2784[3].